(No Model.)
O. T. JONES, Dec'd.
P. Fox, Administrator.
HORSE DETACHER.
No. 281,860.
2 Sheets—Sheet 1.
Patented July 24, 1883.
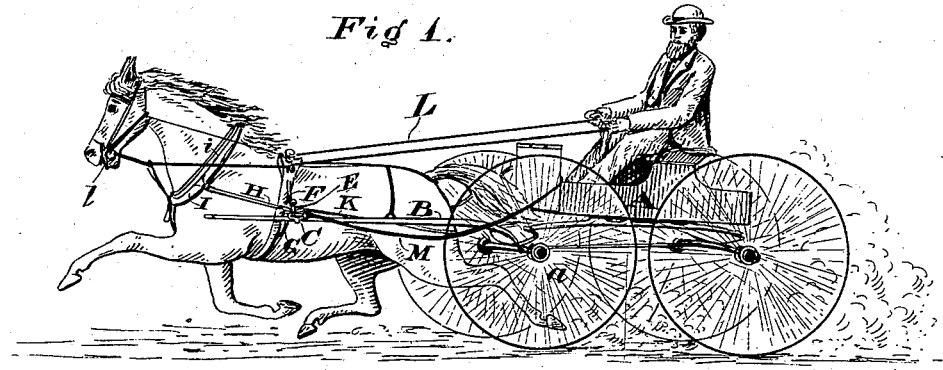
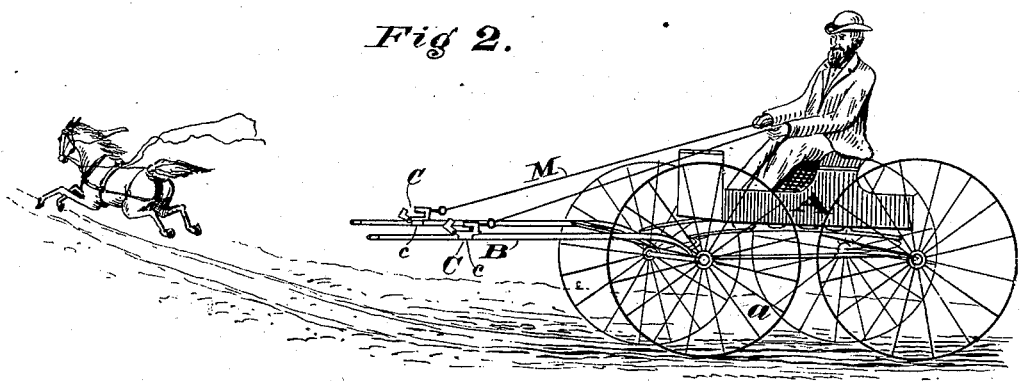
Witnesses.
L. M. Supple
Wm E. Richards
Inventor.
Patrick Fox, Admr.
By E. L. Richardson
Attorneys.

(No Model.) 2 Sheets—Sheet 2.
O. T. JONES, Dec'd.
P. Fox, Administrator.
HORSE DETACHER.
No. 281,860. Patented July 24, 1883.
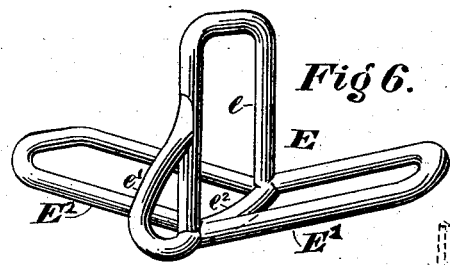
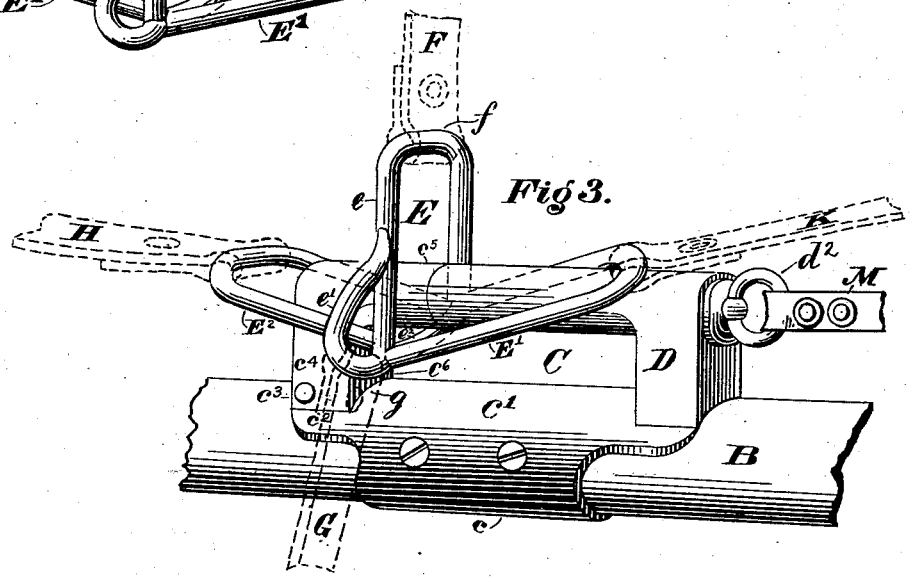
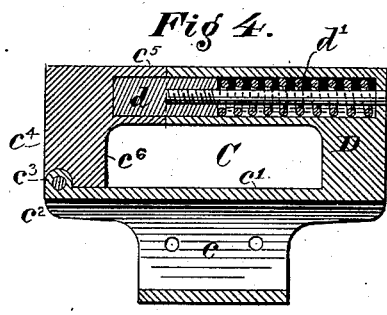
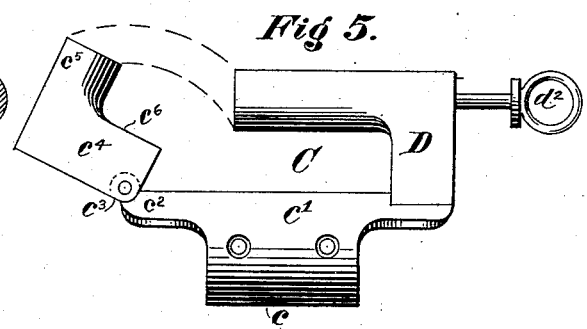
WITNESSES:
K. M. Supple
Wm E. Richards
INVENTOR
Patrick Fox Admr
BY C. J. Richards
ATTORNEYS.

UNITED STATES PATENT OFFICE.

PATRICK FOX, OF NEW ORLEANS, LOUISIANA, ADMINISTRATOR OF OSCAR T. JONES, DECEASED, ASSIGNOR TO THEODORE JONES, OF SAME PLACE.

HORSE-DETACHER.

SPECIFICATION forming part of Letters Patent No. 281,860, dated July 24, 1883.

Application filed December 12, 1882. * (No model.)

*To all whom it may concern:*

Be it known that OSCAR THEODORE JONES, late of New Orleans, in the parish or county of Orleans and State of Lousiana, did invent certain new and useful improvements in means or apparatus for attaching and detaching horses and other animals to and from vehicles, of which the following is a specification.

This invention relates to improvements in means by which draft-animals may be readily attached to and detached from vehicles without necessitating the use of traces or the passage of the saddle-strap through eyes or holes in or being applied around the shafts or thills, and, when necessary, on account of liability to accident, by reason of the running away of the draft-animal, it is necessary or expedient to detach such animal from the vehicle, such detachment can be readily and instantaneously effected by means of supplemental reins, which supplemental reins serve as a means of supporting the thills or shafts and guiding the vehicle until it can be steered to a place of safety and become stationary, owing to the expenditure or counteraction of the velocity or momentum of the vehicle, which necessarily must exist after the animal has been detached from the vehicle.

The nature of this invention will be fully explained by means of the following specification and the accompanying drawings, which form part of this specification, and illustrate what I consider the best means of carrying out the invention.

Figure 1 is a perspective view of a vehicle with a horse attached thereto by means of this invention. Fig. 2 is a similar view, showing the horse detached and the vehicle being guided by the supplemental reins. Fig. 3 is a side view of one of these improved devices, showing the parts in working position. Fig. 4 is a central vertical section of Fig. 3. Fig. 5 is a side view of Fig. 3, with the parts in an open position after letting the horse loose, as shown in Fig. 2. Fig. 6 is a perspective view of the draft and saddle-strap and belly-band-holding portion separately.

In each of the views similar letters of reference are employed to indicate corresponding parts wherever they occur.

A represents the body of the vehicle, and $a$ the wheels thereof.

B are the thills or shafts, to each of which is applied this improved device C, which consists of a tube or holding-piece, $c$, upon the upper portion of which is formed the bearing-plate $c'$, adapted to rest on the upper side of the thills or shafts B.

To the forward end, $c^2$, of the bearing-plate $c'$ is connected, by means of a hinge, $c^3$, an L-shaped piece, $c^4$, in the rear portion, $c^5$, of which is formed or bored a circular or other suitable opening or aperture for the reception of a spring-bolt, $d$, supported and working in an inverted-L-shaped arm, D, formed on or affixed to the bearing-plate $c'$. The bolt $d$ is constantly pressed forward into the position shown by Fig. 4 by means of a coiled or other suitable spring, $d'$, and it is drawn out of that position, so as to release the L-shaped portion $c^4$ and allow of its assuming the position shown in Fig. 5.

E is the draft, saddle-strap, and belly-band-holding piece, one of which is applied to each device C. The part E is composed of a vertical loop, $e$, adapted for the reception of the end $f$ of the saddle-strap F, and which is also provided with a side loop, $e'$, for the reception of one end, $g$, of the belly-band G.

To the lower side of the vertical portion $e\ e'$ is affixed, at a slight angle, the two elongated loops $E'\ E^2$. The loop $E'$, when the holding-piece is in position, as shown by Figs. 1 and 3, is supported by the breeching K, slightly above the upper side of the arm D, while the cross-bar $e^2$ of the vertical loop $e$ rests against the front face, $c^6$, of the L-shaped piece $c^4$, while the forward elongated loop, $E^2$, is attached to the rear end of a short hame-strap, H, the forward end of which is attached to the hames $i$ on the collar I, and by means of which the draft of the vehicle is effected.

L are the ordinary reins, connected with the bit $l$ in the ordinary manner for driving the horse, as shown in Fig. 1.

M is an auxiliary rein, the opposite ends of which are connected in any suitable manner to loops, rings, or equivalent mechanism, $d^2$, formed on or affixed to the rear end of the bolt $d$.

By letting go of the reins L and pulling tightly on the reins M the bolt $d$ will be drawn back, as shown in Fig. 2, when the hame-strap, by reason of the draft of the animal, will cause the cross-bar $e^2$ of the holding-piece E to cause the L-shaped piece $c^t$ to be tilted into the position shown by Figs. 2 and 5, thereby releasing the holding-piece E and entirely freeing the animal from the vehicle. The driver will then have simply to hold the thills or shafts B in position, as shown by Fig. 2, and guide the vehicle to a place of safety, or until it is stopped either by the loss of momentum or by manual or other aid.

Modifications of this improved device may be made without departing from the peculiar character of this invention.

Having thus described this invention, what is claimed, and desired to be secured by Letters Patent, is—

1. In a device for attaching and detaching horses or other animals to and from vehicles, the thill-holding device C, composed of a tube, $c$, hinged piece $c^t$, inverted-L piece D, bolt $d$, and spring $d'$, substantially as and for the purpose described.

2. The harness-holding piece E, composed of a vertical loop, $e$, a loop, $e'$, formed on or affixed to the side of the loop $e$, the cross-bar $e^2$, and the elongated loops $E' E^2$, substantially as and for the purpose set forth.

In witness whereof I have hereunto set my hand this 2d day of September, 1882.

PATRICK FOX,
*Administrator of the estate of Oscar Theodore Jones, deceased.*

Witnesses:
   J. F. COFFEY,
   JNO. L. LARESCHE.